(12) United States Patent
Bock

(10) Patent No.: US 6,267,707 B1
(45) Date of Patent: Jul. 31, 2001

(54) MOTOR VEHICLE HAVING AN AUTOMATIC TRANSMISSION

(75) Inventor: Christian Bock, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/177,875

(22) Filed: Oct. 23, 1998

(30) Foreign Application Priority Data

Oct. 25, 1997 (DE) .............................................. 197 47 270

(51) Int. Cl.[7] ..................................................... F02D 41/10
(52) U.S. Cl. .......................... 477/109; 477/107; 477/110
(58) Field of Search .................................. 477/107, 109, 477/110

(56) References Cited

U.S. PATENT DOCUMENTS

| | | | |
|---|---|---|---|
| 4,955,346 | 9/1990 | Kaneyasu et al. | 123/399 |
| 5,025,380 | 6/1991 | Wataya et al. | 364/431.05 |
| 5,091,854 | * 2/1992 | Yoshimura et al. | 477/109 X |
| 5,097,809 | * 3/1992 | Sekozawa et al. | 477/109 X |
| 5,101,687 | * 4/1992 | Iwatsuki et al. | 477/109 X |
| 5,119,696 | * 6/1992 | Yamaguchi | 477/109 X |
| 5,125,292 | 6/1992 | Matsuoka et al. | 74/844 |
| 5,433,676 | * 7/1995 | Abe et al. | 477/109 |
| 5,445,576 | * 8/1995 | Motamedi et al. | 477/109 X |
| 5,478,293 | 12/1995 | Yonezawa | 477/110 |
| 5,577,979 | * 11/1996 | Iizuka | 477/109 |
| 5,669,849 | * 9/1997 | Tabata et al. | 477/109 X |
| 5,707,317 | * 1/1998 | Tabata et al. | 477/109 |
| 5,820,517 | * 10/1998 | Saito et al. | 477/109 |
| 5,827,151 | * 10/1998 | Sawamura et al. | 477/109 |

FOREIGN PATENT DOCUMENTS

| | | |
|---|---|---|
| 36 32 965 | 9/1986 | (DE) . |
| 39 34 160 | 5/1990 | (DE) . |
| 39 30 375 | 11/1990 | (DE) . |
| 40 28 809 | 3/1992 | (DE) . |
| 196 44 477 | 4/1997 | (DE) . |
| 196 11 839 | 10/1997 | (DE) . |
| 196 15 806 | 10/1997 | (DE) . |
| 0 344 772 | 12/1989 | (EP) . |
| 62-103234 | 5/1987 | (JP) . |
| 1-111543 | 4/1989 | (JP) . |
| 08/193535 | 7/1996 | (JP) . |
| 88/06234 | 8/1988 | (WO) . |

* cited by examiner

Primary Examiner—Khoi Q. Ta
(74) Attorney, Agent, or Firm—Evenson, McKeown, Edwards & Lenahan, P.L.L.C.

(57) ABSTRACT

A process for shifting an automatic transmission in a motor vehicle having an electronic engine timing system which is electrically coupled with a driving element (e.g., an accelerator pedal). The electronic engine timing system is electrically coupled with an electronic transmission control system. When a change-gear operation is taking place in the automatic transmission and the automatic transmission is in a critical shifting phase, and simultaneously the driving element is adjusted to demand increased output from the engine, if the rate of the adjusting change and the extent of the desired new output together exceed a predetermined value, the increase in engine output is delayed and/or the gradient of the engine output increase is limited or delayed by adjusting the engine timing system.

12 Claims, 2 Drawing Sheets

MOTOR VEHICLE HAVING AN AUTOMATIC TRANSMISSION

BACKGROUND AND SUMMARY OF THE INVENTION

This application claims the priority of German patent 197 47 270, filed Oct. 25, 1997, the disclosure of which is expressly incorporated by reference herein.

The invention relates to a motor vehicle having an automatic transmission and to a process for shifting such an automatic transmission.

Automatic transmissions within the scope of the invention are fully automatic transmissions, in which gears are shifted automatically as a function of the driving speed as well as partially automatic transmissions, in which a driver can manually select the gear speeds and the selected gear is then shifted automatically, as well as transmissions which comprise both possibilities.

In most motor vehicles, the engines and the transmission remain in the same adjustment in all operating situations, particularly the advance angle in the case of Otto engines and the system fluid pressure for operating shifting clutches and shifting brakes in the automatic transmission. The engine reacts only to changes of the position of the gas pedal. In the following, instead of "gas pedal", the term "driving element" will be used for all types of foot-operable or manually operable fuel adjusting elements of Otto engines and of diesel engines.

In practice, it is known, at least in the case of higher-priced vehicles, to change, during a change-speed operation of the automatic transmission, the advance angle of an Otto engine or to throttle the diesel fuel injection of a diesel engine or to lower the system pressure of the fluid which operates shifting clutches and/or shifting brakes, so that the gears are shifted "smoothly", particularly when the motor vehicle is rolling, for example, downhill, while the engine power is set to a low value at the driving element, or during a "slow" acceleration.

The invention relates to automatic transmissions in which, during a speed change, the combination of the gear wheels which mesh with one another is changed. For this purpose, the automatic transmission contains shifting clutches and usually also shifting brakes. For simplifying the description, only the term "shifting clutches" will be used which also includes shifting brakes.

Basically, in the case of all known motor vehicles, a "critical shifting condition" will occur when one or several shifting clutches of the automatic transmission are pushed into their closing position not by means of the complete fluid system pressure. Such a critical shifting condition will exist:

a) When a connected (output) shifting clutch of the previous gear and a connected (input) shifting clutch of the new gear are both operating with a slip in the frictional operation; that is, when both shifting clutches are in the delivery phase. In this delivery phase, the engine may have an undesirably high rotation or may overrev if the driver suddenly sets a significantly higher engine power at the driving element.

b) When the connected shifting clutch is just before the synchronous operation with the transmission part (gear wheel or a planet carrier of a planetary transmission), and the disconnected shifting clutch is already fully open; or when the connected shifting clutch has reached the synchronous operation with its transmission part but its clutch closing pressure has not yet risen to the full system pressure. During these two shifting phases, torque jolts, for example, as the result of a significantly higher engine output suddenly set by the driver at the driving element, are undesirable because they may cause the connected shifting clutch to slip more or to slip again before it will then be completely closed when the full system pressure of its clutch fluid is reached.

c) When the fluid pressure of the disconnected shifting clutch was lowered to below the full system pressure by an initiated shifting operation and holds the disconnected shifting clutch just barely still completely closed or still in the friction slip operation.

This means that the "critical shifting condition" starts as soon as the fluid closing pressure of a disconnected shifting clutch falls below the full system pressure, the critical shifting condition then continuing in the delivery phase, and then still lasting until the connected shifting clutch of a newly selected gear is displaced by its operating fluid so far into the closing position that it can no longer slip at the engine power set by the driver at the driving element.

The driving element can be mechanically connected by means of a linkage or a cable control with the fuel feeding device of the engine, such as a carburetor or an injection system, or can be coupled electronically. The currently known electronic fuel adjusting systems in motor vehicles act like the conventional mechanical fuel adjusting systems. In this case, a power change of the engine desired by the driver of the motor vehicle, and thus a torque change, when the driving element is operated, immediately results in a corresponding increase or reduction of the engine power and of its torque. If the driver suddenly desires a significant power change and sets it at the driving element, while a shifting operation is taking place in the automatic transmission, the considerable rise of the engine torque may lead to a poor shifting comfort. For example, automatic gear shifts during the coasting of the vehicle are particularly critical, or the shifting of gears while the engine is running with little gas or standing gas and, in this case, shifting clutches are operated at very low clutch pressures for optimizing the shifting comfort. If, during such a condition, the driver suddenly significantly increases the torque of the engine at the driving element so that a fast rise of the torque occurs at the engine, the fluid pressure control, which controls the pressure of the operating fluid of the shifting clutches of the transmission, may not sufficiently rapidly follow the fast torque rise of the engine so that a considerable slip will occur in the shifting clutches and the engine will rev, before the operating fluid of the shifting clutches reaches to full system pressure and closes the shifting clutches again. This results in a significant shifting jolt.

It is an object of the invention to significantly improve, in the case of motor vehicles with a partially automatic or fully automatic transmission and an electronic fuel adjusting system, the shifting comfort during critical shifting phases of the automatic transmission.

This and other objects have been achieved according to the present invention by providing a process for shifting an automatic transmission in a motor vehicle having an internal-combustion engine and an electronic engine timing system which is electrically coupled with a driving element, the driving element being adjustable by a driver to demand a change in output of the engine, the automatic transmission having an electronic transmission control system which automatically shifts transmission gears, wherein the electronic transmission control system is electrically coupled with the electronic engine timing system and both of said systems are constructed such that when (a) an adjustment of the driving element is being made to demand an increase in the output of the engine to a desired higher output, and simultaneously (b) a gear shift operation is taking place in the automatic transmission and the automatic transmission is in a critical shifting phase in which an undesirable slip operation condition or an undesirable jolt-type termination of a slip operation would occur if the engine output were immediately increased to said desired higher output, then, the increase in output from the engine is controlled according to at least one of the following conditions: (i) delaying the increase in output from the engine for a period of time; and (ii) reducing or limiting a gradient of the increase in output from the engine via the engine timing system.

This and other objects have been achieved according to the present invention by providing a motor vehicle having an automatic transmission, an internal-combustion engine, and an electronic engine timing system which is electrically coupled with a driving element, the driving element being adjustable by a driver to demand a change in output of the engine, the automatic transmission having an electronic transmission control system which automatically shifts transmission gears, wherein the electronic transmission control system is electrically coupled with the electronic engine timing system and both of said systems are constructed such that when (a) an adjustment of the driving element is made to demand an increase in the output of the engine to a desired higher output, and simultaneously (b) a gear shift operation is taking place in the automatic transmission and the automatic transmission is in a critical shifting phase in which an undesirable slip operation condition or an undesirable jolt-type termination of a slip operation would occur if the engine output were immediately increased to said desired higher output, if a rate of the adjustment and an extent of the desired higher output each exceed respective predetermined values, the increase in output from the engine is controlled according to at least one of the following conditions: (i) the increase in output from the engine is delayed for a period of time; and (ii) a gradient of the increase in output from the engine is reduced or limited by the engine timing system.

This and other objects have been achieved according to the present invention by providing a method of controlling a transmission with automatically shiftable gears in a motor vehicle having an internal-combustion engine, said method comprising the act of: when a demand for increased engine output is made while the transmission is in a critical shifting phase of a gear shift operation, controlling an increase in the engine output according to at least one of the following conditions: (i) delaying the increase in the engine output for a period of time; and (ii) reducing or limiting a gradient of the increase in engine output.

Other objects, advantages and novel features of the present invention will become apparent from the following detailed description of the invention when considered in conjunction with the accompanying drawings.

DETAILED DESCRIPTION OF THE DRAWINGS

Figure 1:
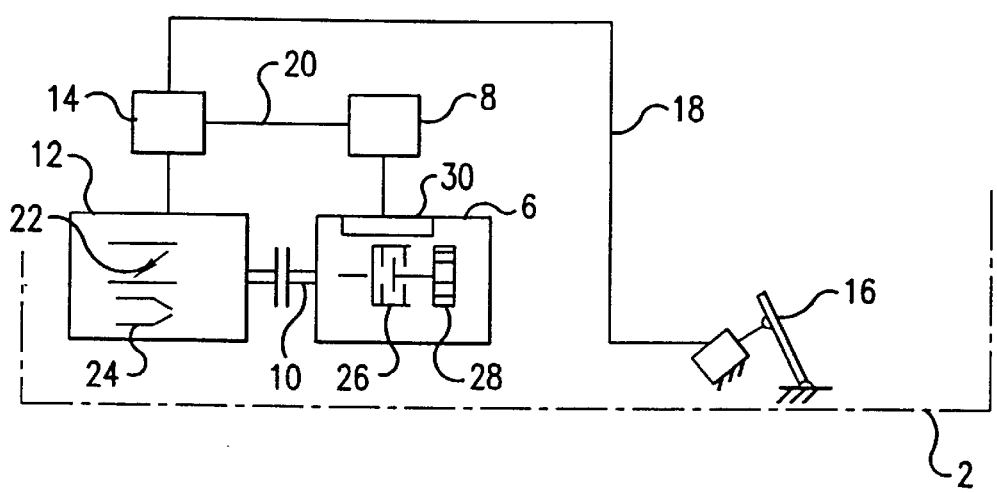
FIG. 1 is a schematic view of a portion of a motor vehicle having an engine control and transmission control according to a preferred embodiment of the present invention.

FIG. 1 is a schematic view of a portion of a motor vehicle chassis 2. An internal-combustion engine 12 (Otto engine or diesel engine) is situated on the chassis and has an electronic engine timing system 14. A fully automatic or partially automatic transmission 6 is coupled with the engine 12 via a drive connection 10. An electronic transmission control system 8 controls automatic shifting of gears of the automatic transmission 6. A driving element 16 which can be adjusted by the driver as a function of the desired engine power and of the desired engine torque and which is coupled via an electric line 18 or wirelessly with the engine timing system 14 so that adjustments and adjustment changes carried out by the driver at the driving element 16 are communicated to the engine timing unit 14. In FIG. 1, the driving element 16 is constructed as an accelerator pedal (for adjusting the flow of gasoline to an Otto engine, or for adjusting the flow of diesel fuel to a diesel engine). In an alternative embodiment, the driving element may also be a manually operable element.

The electronic transmission control system 8 informs the engine timing unit 14 by way of a serial data bus 20 when the automatic transmission 6 is just in a critical phase of a gear change. As previously described, the critical phase may be an interval or the whole time period of the initially described "critical shifting condition". If, during such a critical phase, the driver sets a power increase and therefore also a torque increase at the driving element 16, the driver's desire is carried out in a delayed manner by the engine timing system 14 not before the automatic transmission 6 has returned to a more stable shifting phase.

The automatic transmission 6 may be a fully automatic transmission whose gears are shifted automatically as a function of the vehicle speed, or a partially automatic transmission, in the case of which the driver selects a desired gear on a selecting device, which gear will then be automatically shifted by the transmission control system 8. Transmission constructions are also contemplated which incorporate both types of transmissions (i.e., including both a fully automatic mode and a partially automatic mode). The automatic transmission 6 contains shifting clutches, which are not shown, and optionally also shifting brakes which mutually combine gear wheels contained in the automatic transmission 6 and other gears not shown, according to the selected gear.

So that the driver will not have the impression that the engine 12 reacts too sluggishly, the above-described delay of the increase of the torque, after such an increased torque was set at the driving element 16, must be permissible only for short time periods, for example, in the order of from 100 to 400 ms; preferably only between 200 to 300 ms.

According to an alternative embodiment of the invention, the engine 12 is not adjusted in a delayed manner to the torque demanded by the driver on the driving element 16, but in an undelayed manner, however, with a reduced or limited gradient of the torque increase of the engine. In other words, the increase or the rate of increase of the torque of the engine is reduced or limited to a predetermined value by measures of corresponding measures in the engine timing system 14.

According to a further alternative embodiment of the invention, the two above-mentioned alternatives may be combined with one another, specifically the above-described delay and the above-described reduction or limitation of the gradient of the torque increase. In this case, the delay time may be shortened.

In all preferred embodiments, the delay and/or the reduction or limitation of the gradient of the torque increase of the engine 12 takes place automatically by electronic measures in the engine timing system 14 as a function of the operating conditions of the automatic transmission 6 reported by the transmission control system 8 and as a function of the adjusting position or of a change of the adjusting position of the driving element 16 when, during a critical phase of a gear change of the automatic transmission 6, the driver demands a fast significant torque increase at the driving element 16. Preferably, the engine timing system 14 and the transmission control system 8 are constructed such that they do not adjust a torque increase of the engine 12 demanded at the driving element 16 in a delayed manner or with a reduced or limited gradient of the torque increase at the engine 12 if only a slight or only a very slowly rising torque increase is demanded at the driving element 16.

In the case of an Otto engine, which has a throttle valve 22 for regulating the fuel-air feeding, the above-described delay and/or reduction or limitation of the gradient of the torque increase of the engine 12 can be achieved by a correspondingly delayed or slowed-down opening of the throttle valve 22.

In the case of a diesel engine, the above-described delay and/or reduction or limitation of the gradient of the torque increase of the engine 12 can be achieved by a correspondingly delayed or slowed-down increase of the diesel oil feeding quantity which is injected into the diesel engine.

There are motor vehicles with automatic transmissions in which, during a change-speed operation, the system pressure (normal pressure) of the fluid which operates the shifting clutches of the automatic transmission is lowered so that the gears are shifted in a "smooth" manner. In addition, for the "smooth" shifting of the gears of automatic transmissions in the case of vehicles with an Otto engine, it is known to correspondingly change the advance angle of the Otto engine during a change-speed operation. The present invention can also be used in the case of the known motor vehicles in which such a lowering of the system pressure of the clutch operating fluid and/or such an adjustment of the advance angle takes place. In this case, in addition to the known measures according to the invention, a fast torque increase of the engine 12 set by the driver at the driving element 16 is carried out on the engine 12 in the above-described manner at first for a short time in a delayed manner or with a reduced or limited gradient of the torque increase.

FIG. 1 contains respective schematic views of a fuel injection system 24 of the internal-combustion engine 12 as an alternative to the throttle valve 22, a shifting clutch 26, a gear wheel 28 as well as an arrangement of several valves 30 of the automatic transmission 6. The valves of the valve arrangement 30 are operated by the electronic transmission control system 8 for feeding pressure fluid (or compressed air) for operating the shifting clutches 26 (as well as any existing shifting brakes) of the automatic transmission 6 as a function of the transmission gear to be engaged.

Figure 2:
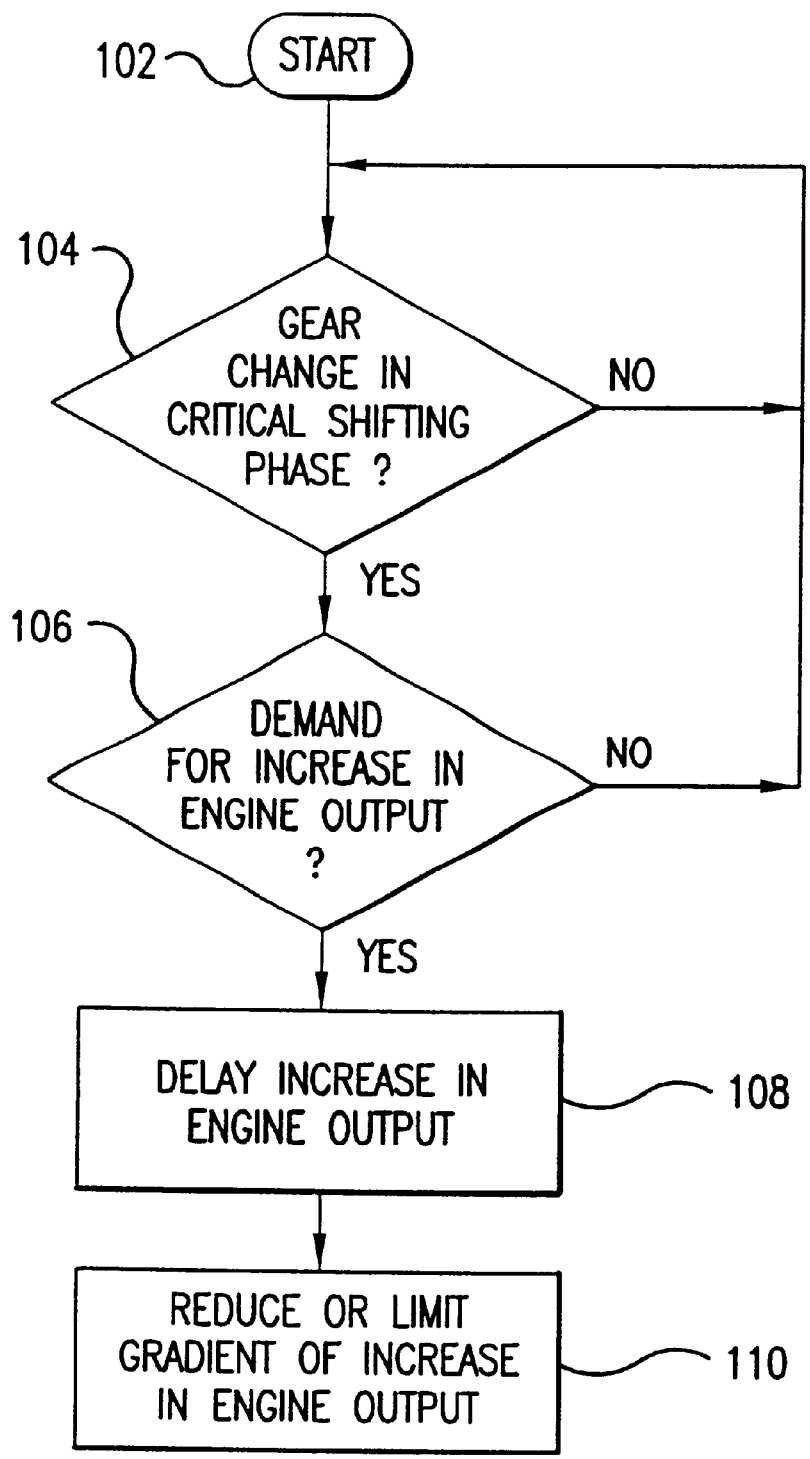
FIG. 2 is a flowchart showing a method according to a preferred embodiment of the present invention.

FIG. 2 shows a flowchart of a method of shifting a transmission with automatically shiftable gears (whether fully or partially automatic) according to a preferred embodiment of the present invention. The method is started in act 102. In act 104, it is determined whether a critical shifting phase of a gear change is taking place. If so, in act 106 it is further determined whether there is also a demand for an increase in engine output (e.g., via a driving element 16). If so, then in act 108, the increase in engine output is delayed, and in act 110, the gradient of the increase in engine output is reduced or limited. Although both of acts 108 and 110 are shown in FIG. 2, tt should be clearly understood from the foregoing that the instant also contemplates performing the method with only one or the other of acts 108 and 110.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for shifting an automatic transmission in a motor vehicle having an internal-combustion engine in which fuel is injected, and an electronic engine timing system which is coupled with a driving element, the driving element being adjustable by a driver to demand a change in output of the engine, the automatic transmission having an electronic transmission control system which automatically shifts transmission gears, wherein the electronic transmission control system is electrically coupled with the electronic engine timing system and both of said systems are constructed such that when:

(a) an adjustment of the driving element is being made to demand an increase in the output of the engine to a desired higher output, and simultaneously (b) a gear shift operation is taking place in the automatic transmission and the automatic transmission is in a critical shifting phase in which an undesirable slip operation condition or an undesirable jolt-type termination of a slip operation would occur if the engine output were immediately increased to said desired higher output, if a rate of said adjustment and an extent of the desired higher output each exceed predetermined values, respectively, then the increase in output from the engine is controlled according to at least one of the following conditions:

(i) delaying the increase in output from the engine for a period of time; and (ii) reducing or limiting a gradient of the increase in output from the engine via the engine timing system;

wherein said at least one of said conditions (i) and (ii) is performed by controlling the fuel infection with the electronic engine timing system as a function of the adjustment of the driving element.

2. A process for shifting an automatic transmission in a motor vehicle having an internal-combustion engine and an electronic engine timing system which is coupled with a driving element, the driving element being adjustable by a driver to demand a change in output of the engine, the automatic transmission having an electronic transmission control system which automatically shifts transmission gears, wherein the electronic transmission control system is electrically coupled with the electronic engine timing system and both of said systems are constructed such that when:

(a) an adjustment of the driving element is being made to demand an increase in the output of the engine to a desired higher output, and simultaneously (b) a gear shift operation is taking place in the automatic transmission and the automatic transmission is in a critical shifting phase in which an undesirable slip operation condition or an undesirable jolt-type termination of a slip operation would occur if the engine output were immediately increased to said desired higher output, if a rate of said adjustment and an extent of the desired higher output each exceed predetermined values, respectively, then the increase in output from the engine is controlled according to at least one of the following conditions:

(i) delaying the increase in output from the engine for a period of time; and (ii) reducing or limiting a gradient of the increase in output from the engine via the engine timing system;

wherein said period of time is 100 to 400 ms.

3. A process according to claim 2, wherein said period of time is 200 to 300 ms.

4. A process according to claim 1, wherein said controlling act consists of condition (i).

5. A process controlling to claim 1, wherein said controlling act consists of condition (i).

6. A process according to claim 1, wherein said contolling act of condition (i) and (ii).

7. A motor vehicle having an automatic transmission, an internal-combustion engine in which fuel is injected, and an electronic engine timing system which is coupled with a driving element, the driving element being adjustable by a driver to demand a change in output of the engine, the automatic transmission having an electronic transmission control system which automatically shifts transmission gears, wherein the electronic transmission control system is electrically coupled with the electronic engine timing system and both of said systems are constructed such that if:

(a) an adjustment of the driving element is made to demand an increase in the output of the engine to a desired higher output, and simultaneously (b) a gear shift operation is taking place in the automatic transmission and the automatic transmission is in a critical shifting phase in which an undesirable slip operation condition or an undesirable jolt-type termination of a slip operation would occur if the engine output were immediately increased to said desired higher output, if a rate of said adjustment and an extent of the desired higher output each exceed predetermined values, respectively, then the increase in output from the engine is controlled according to at least one of the following conditions:

(i) the increase in output from the engine is delayed for a period of time; and (ii) a gradient of the increase in output from the engine is reduced or limited by the engine timing system;

wherein said at least one of said conditions (i) and (ii) is performed by controlling the fuel injection with the electronic engine timing system as a function of the adjustment of the driving element.

8. A method of controlling a transmission with automatically shiftable gears in a motor vehicle having an internal-combustion engine in which fuel is injected, said method comprising the act of:

when a sudden demand for a significantly increased engine output is made while the transmission is in a critical shifting phase of a gear shift operation, controlling an increase in the engine output according to at least one of the following conditions:

(i) delaying the increase in the engine output for a period of time; and (ii) reducing or limiting a gradient of the increase in engine output;

wherein said controlling act is performed by controlling the fuel injection with the electronic engine timing system as a function of the adjustment of the driving element.

9. A method according to claim 8, wherein said controlling act consists of condition (i).

10. A method according to claim 8, wherein said controlling act consists of condition (ii).

11. A method according to claim 8, wherein said controlling act consists of conditions (i) and (ii).

12. A control system for controlling a transmission of a motor vehicle which is operated according to the method of claim 8.

\* \* \* \* \*